United States Patent
Zato et al.

(10) Patent No.: US 8,806,562 B2
(45) Date of Patent: Aug. 12, 2014

(54) AUDIO/VIDEO COMPONENT NETWORKING SYSTEM AND METHOD

(75) Inventors: Thomas J. Zato, Santa Clara, CA (US); Raphael Gernez, Los Altos, CA (US); Richard Chi-Te Shen, Morgan Hill, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2078 days.

(21) Appl. No.: 11/588,934

(22) Filed: Oct. 27, 2006

(65) Prior Publication Data

US 2008/0115183 A1    May 15, 2008

(51) Int. Cl.
    *H04N 7/16*    (2011.01)

(52) U.S. Cl.
    USPC ........................................................ 725/143

(58) Field of Classification Search
    None
    See application file for complete search history.

(56) References Cited

U.S. PATENT DOCUMENTS

| | | | |
|---|---|---|---|
| 5,473,317 A | 12/1995 | Inomata | |
| 6,005,597 A | 12/1999 | Barrett | |
| 6,131,136 A | 10/2000 | Liebenow | |
| 6,202,211 B1 | 3/2001 | Williams | |
| 6,237,049 B1 | 5/2001 | Ludtke | |
| 6,263,503 B1 | 7/2001 | Margulis | |
| 6,417,869 B1 | 7/2002 | Do | |
| 6,757,912 B1 | 6/2004 | Vaughan | |
| 7,171,677 B1 | 1/2007 | Ochiai | |
| 2002/0007488 A1 | 1/2002 | Kikinis | |
| 2002/0053081 A1 | 5/2002 | Griggs | |
| 2002/0056098 A1 | 5/2002 | White | |
| 2002/0056118 A1 | 5/2002 | Hunter | |
| 2002/0078293 A1 | 6/2002 | Kou | |
| 2002/0174444 A1 | 11/2002 | Gatto | |
| 2003/0027517 A1 | 2/2003 | Callway | |
| 2003/0028889 A1 | 2/2003 | McCoskey | |
| 2003/0048757 A1 | 3/2003 | Accarie | |
| 2003/0066082 A1 | 4/2003 | Kliger | |
| 2003/0093795 A1 | 5/2003 | Takahashi | |
| 2003/0193619 A1 | 10/2003 | Farrand | |
| 2004/0019908 A1 | 1/2004 | Williams | |
| 2004/0049797 A1 | 3/2004 | Salmonsen | |
| 2004/0184525 A1 | 9/2004 | Lee | |
| 2004/0187152 A1 | 9/2004 | Francis | |
| 2005/0213439 A1 | 9/2005 | Johnson | |
| 2005/0216570 A1 | 9/2005 | Johnson | |
| 2005/0216944 A1 | 9/2005 | Johnson | |
| 2005/0216946 A1 | 9/2005 | Johnson | |
| 2005/0216952 A1 | 9/2005 | Johnson | |

(Continued)

FOREIGN PATENT DOCUMENTS

| | | |
|---|---|---|
| GB | 2325537 | 11/1998 |
| GB | 2375674 | 11/2002 |

(Continued)

OTHER PUBLICATIONS

U.S. Appl. No. 10/808,015, Office Action dated Dec. 12, 2008, pp. 1-15.

(Continued)

*Primary Examiner* — Nasser Goodarzi
*Assistant Examiner* — Fred Peng

(57) ABSTRACT

An audio/video (A/V) component networking system, comprising a presentation device and a sink component configured to simultaneously present on the presentation device A/V program data received from at least two different source components.

16 Claims, 8 Drawing Sheets

(56) References Cited

U.S. PATENT DOCUMENTS

| | | |
|---|---|---|
| 2005/0273819 A1 | 12/2005 | Knudson |
| 2006/0140584 A1 | 6/2006 | Ellis |
| 2008/0022322 A1* | 1/2008 | Grannan et al. .................. 725/78 |

FOREIGN PATENT DOCUMENTS

| | | |
|---|---|---|
| GB | 2406458 | 3/2005 |
| JP | 05-260556 | 8/1993 |
| JP | 07-336778 | 12/1995 |
| JP | 10-229409 | 8/1998 |
| JP | 2002-261995 | 9/2002 |
| JP | 2004207864 | 7/2004 |
| WO | WO 2004/095345 | 11/2004 |
| WO | WO 2004/095346 | 11/2004 |
| WO | WO 2004/098189 | 11/2004 |

OTHER PUBLICATIONS

U.S. Appl. No. 10/808,015, Final Rejection dated Jul. 10, 2008, pp. 1-16.

U.S. Appl. No. 10/808,015, Office Action dated Jan. 30, 2008, pp. 1-16 including attachments.

U.S. Appl. No. 10/808,015, Office Action dated Aug. 24, 2007, pp. 1-15.

U.S. Appl. No. 10/808,015, Office Action dated Mar. 26, 2007, pp. 1-8 including attachments.

U.S. Appl. No. 10/808,036, Office Action dated Dec. 12, 2008, pp. 1-21.

U.S. Appl. No. 10/808,036, Final Rejection dated Jul. 8, 2008, pp. 1-15.

U.S. Appl. No. 10/808,036, Office Action dated Jan. 30, 2008, pp. 1-19 including attachments.

U.S. Appl. No. 10/808,036, Final Rejection dated Aug. 24, 2007, pp. 1-11.

U.S. Appl. No. 10/808,036, Office Action dated Mar. 27, 2007, pp. 1-7 including attachments.

U.S. Appl. No. 10/808,037, Office Action dated Sep. 12, 2007, pp. 1-14 including attachments.

U.S. Appl. No. 10/808,012, Final Rejection dated Dec. 24, 2008, pp. 1-14.

U.S. Appl. No. 10/808,012, Office Action dated May 6, 2008, pp. 1-10 including attachments.

U.S. Appl. No. 10/808,012, Final Rejection dated Oct. 9, 2007, pp. 1-16.

U.S. Appl. No. 10/808,012, Office Action dated Apr. 19, 2007, pp. 1-11 including attachments.

U.S. Appl. No. 10/808,136, Final Rejection dated Dec. 10, 2008, pp. 1-16.

U.S. Appl. No. 10/808,136, Office Action dated May 16, 2008, pp. 1-14 including attachments.

U.S. Appl. No. 10/808,136, Final Rejection dated Jan. 3, 2008, pp. 1-13.

U.S. Appl. No. 10/808,136, Office Action dated Aug. 10, 2007, pp. 1-9 including attachments.

Foreign Communication relating to Appl. No. GB 0504981.2 including International Search Report dated Jun. 28, 2005 (3 pages).

* cited by examiner

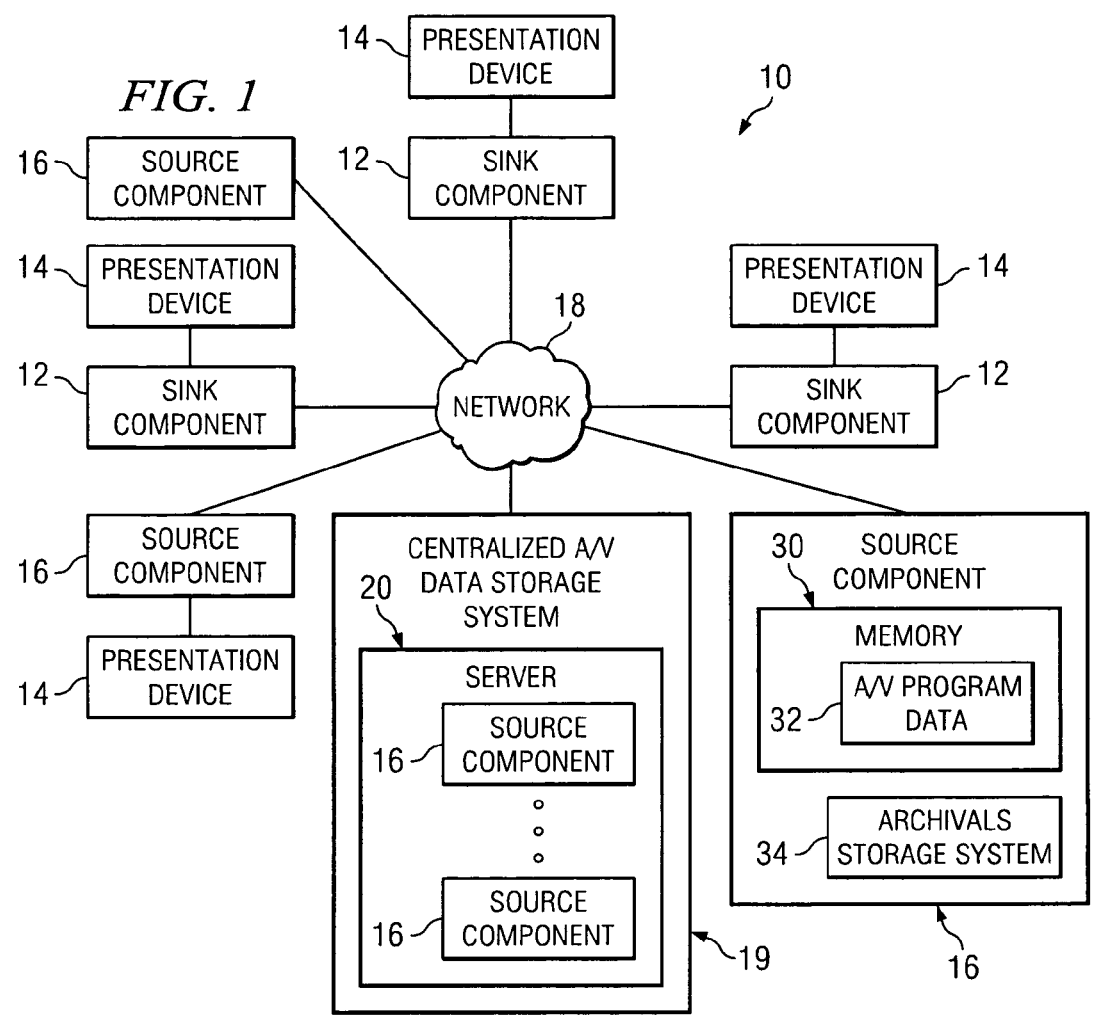
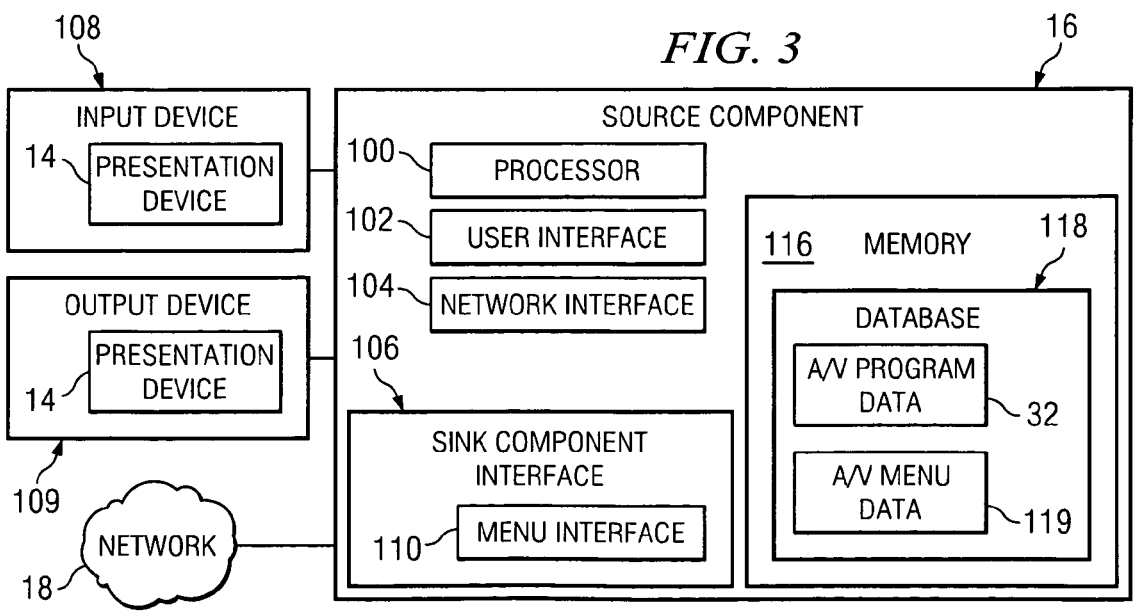

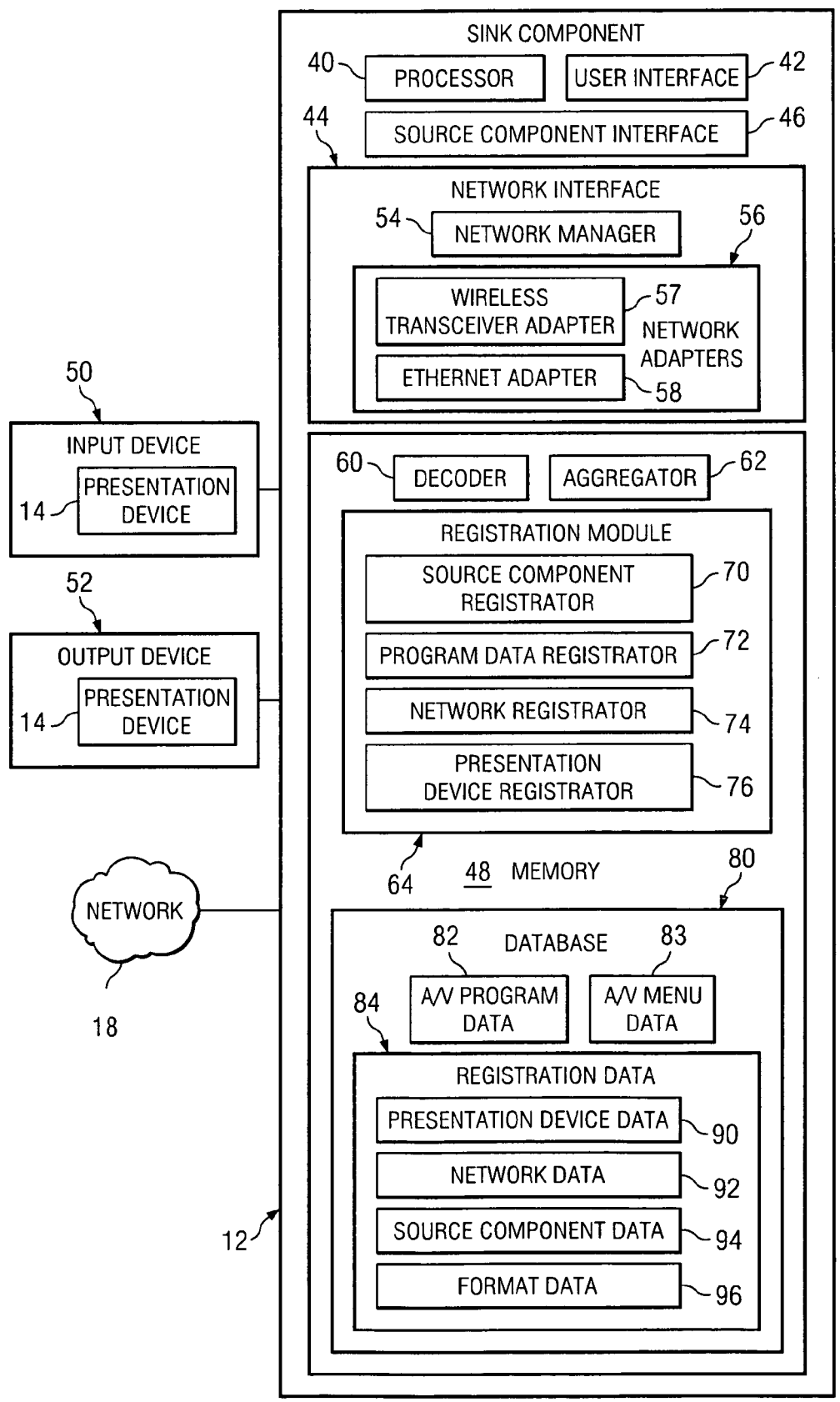

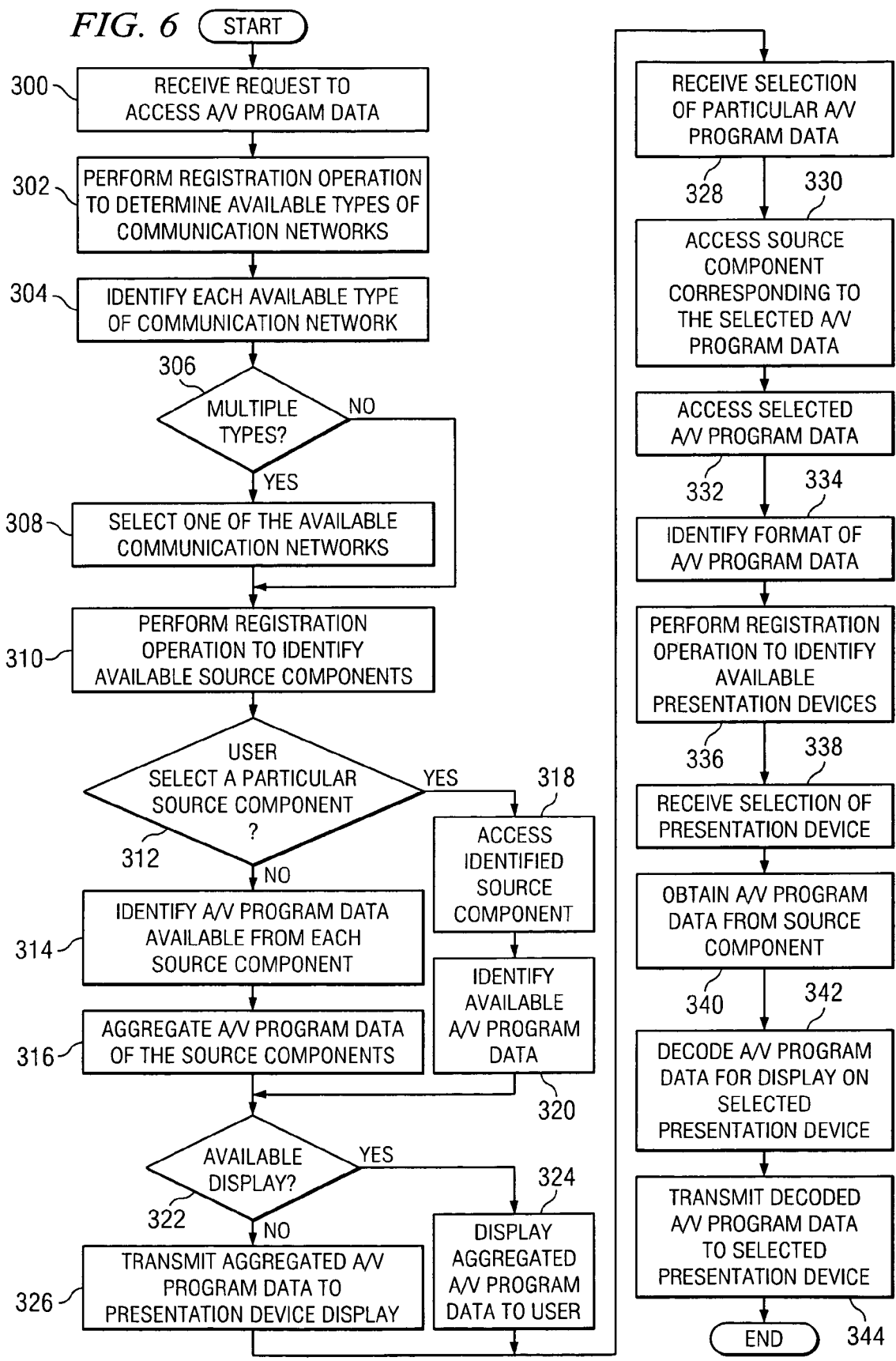

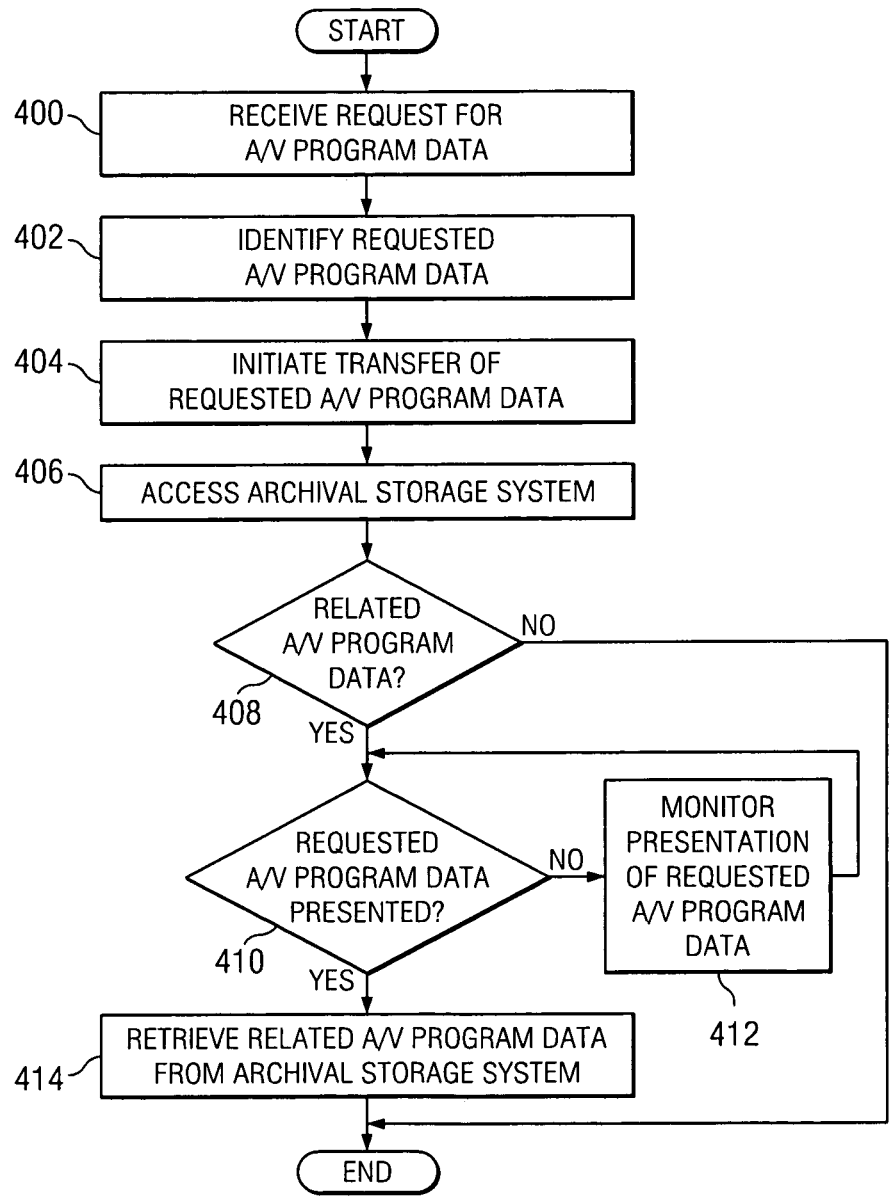

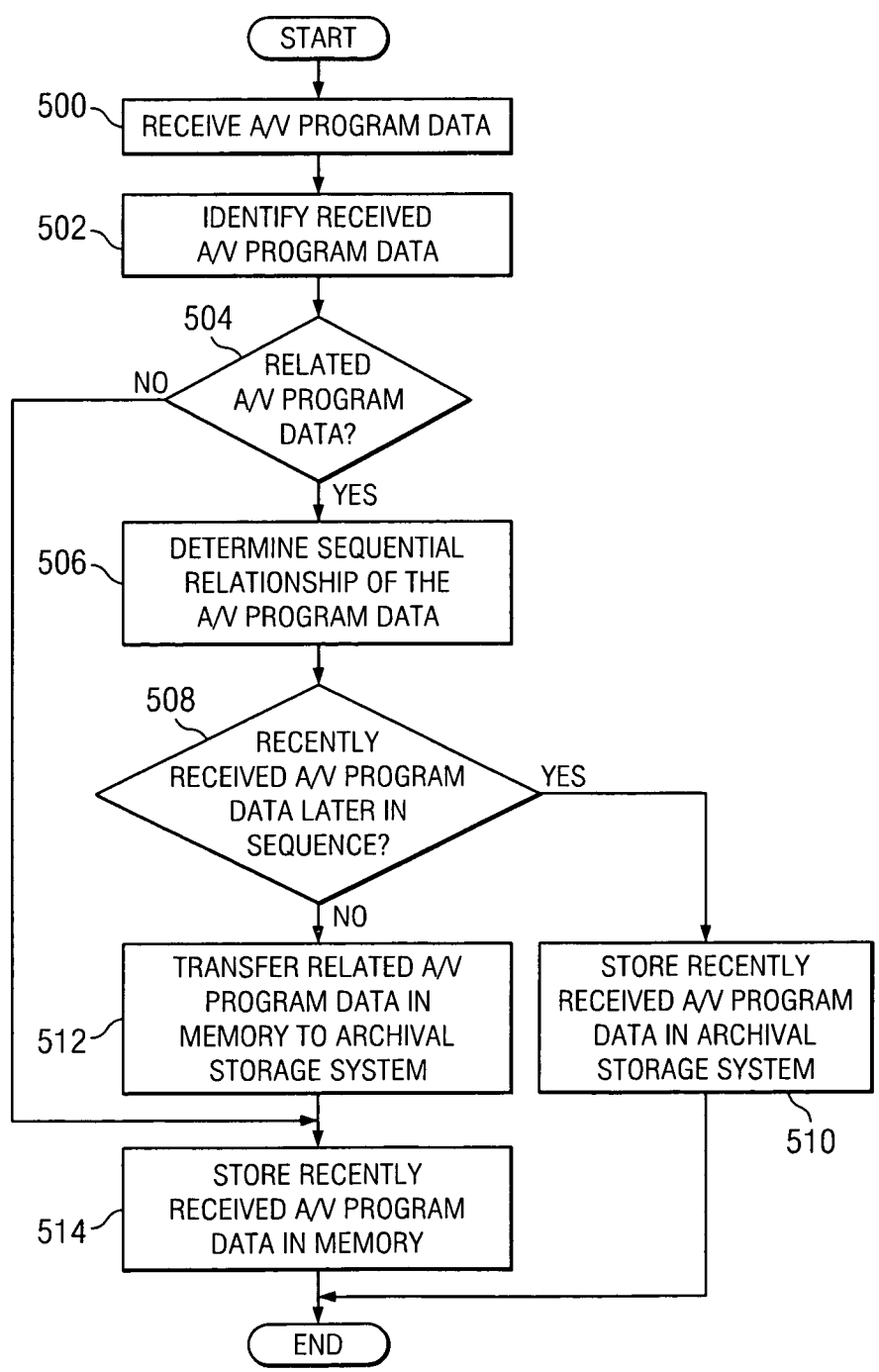

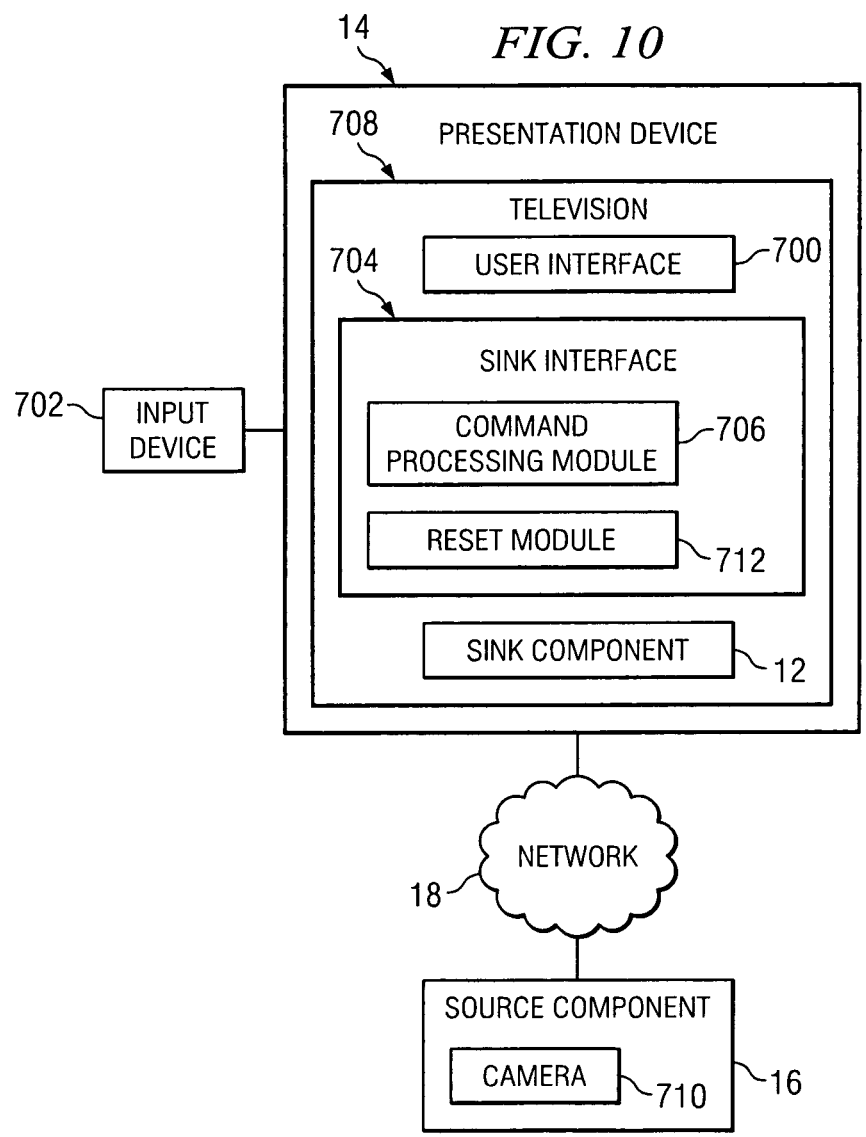

AUDIO/VIDEO COMPONENT NETWORKING SYSTEM AND METHOD

BACKGROUND

A variety of types of audio and video components are generally found in a home or business. For example, most homes contain at least a television (TV), a personal video recorder (PVR), a videocassette recorder (VCR), and/or a digital video disk (DVD) player. In addition, many homes contain a stereo system and/or a computer system. Such stereo systems may range from a single component, such as a clock radio, to a multi-component system that includes a receiver, one or more amplifiers, a tape player, a compact disc (CD) player, and/or other components. The computer system may comprise a laptop computer, desktop computer, or another type of computing component.

These systems are generally independently controlled. For example, a cable or satellite tuner/demodulator may connect a cable or satellite system to a TV, and a DVD player may be connected to the same TV or another TV in another room. Generally, a user controls components such as the DVD player and the cable or satellite tuner using individual remote controls. To facilitate control of both of these components, universal programmable remote control technology enables the user to control the DVD player and the cable component using a single remote control. It has also become possible to connect audio and video components together into a single larger system that individual components are distributed about various rooms around the household. Unfortunately, controlling these systems becomes complex and difficult.

One solution has been proposed to combine these technologies into a single all-in-one system that may then drive, for example, a single TV. As one example, this all-in-one system may include a DVD player, a personal video recorder (PVR) dish, and a cable tuner. Unfortunately, this solution usually requires extremely complex electronics and/or logic. Moreover, since consumers usually desire different features, design of an all-in-one system for some consumers usually does not fit the needs of other consumers. Moreover, if a consumer buys an all-in-one system and later decides that a new feature is desired, such systems cannot generally accommodate the addition of new features. Lastly, an all-in-one system presents a single point of failure problem that may require the entire system to be inoperable and/or unavailable until repaired.

BRIEF DESCRIPTION OF THE DRAWINGS

For a more complete understanding of the objects and advantages thereof, reference is now made to the following descriptions taken in connection with the accompanying drawings in which:

FIG. 1 is a diagram illustrating an embodiment of an audio/video component networking system;

FIG. 2 is diagram illustrating an embodiment of a component of the audio/video component networking system illustrated in FIG. 1;

FIG. 3 is diagram illustrating an embodiment of another component of the audio/video component networking system illustrated in FIG. 1;

FIG. 6 is a flow diagram illustrating an embodiment of an audio/video component networking method;

FIG. 7 is a flow diagram illustrating another embodiment of an audio/video component networking method;

FIG. 8 is a flow diagram illustrating yet another embodiment of an audio/video component networking method;

FIG. 10 is a diagram illustrating another embodiment of an audio/video component networking system.

DETAILED DESCRIPTION OF THE DRAWINGS

Figure 4:
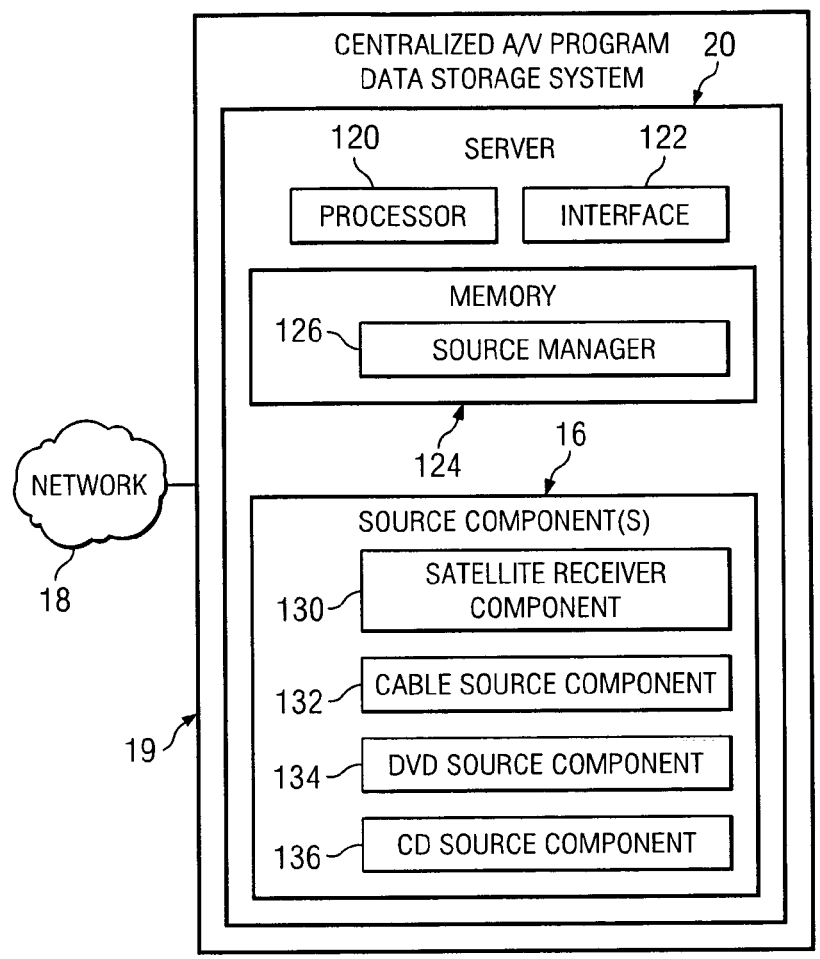
FIG. 4 is diagram illustrating an embodiment of another component of the audio/video component networking system illustrated in FIG. 1.

The preferred embodiments and the advantages thereof are best understood by referring to FIGS. 1-10 of the drawings, like numerals being used for like and corresponding parts of the various drawings.

FIG. 1 is a diagram illustrating an embodiment of an audio/video component networking system 10. Briefly, system 10 provides a distributed audio/video component network for a household, hotel or other structure enabling a user located in one room to access and retrieve a variety of different types of audio/video program data from a variety of different sources located in other rooms or other locations remote from a presentation device, such as television or stereo system, and display the audio/video program data on a desired presentation device. Additionally, embodiments enable a user to access and control menu parameters associated with remotely located audio/video program data sources for performing menu-related actions corresponding to a desired audio/video program data source such as, but not limited to, viewing a library of available audio/video program data, paging or otherwise moving forward or backward within a particular audio/video program data file, changing broadcast channels or otherwise selecting a desired audio/video program file or program data stream, and displaying menu options available on the corresponding audio/video program data source.

In the embodiment illustrated in FIG. 1, system 10 comprises at least one sink component 12 communicatively coupled to at least one presentation device 14. Additionally, the sink component 12 is communicatively coupled to at least one source component 16 via a communication network 18. Presentation device 14 may comprise any device for presenting audio/video (A/V) program data to a user such as, but not limited to, speakers, a computer, a monitor, a television, a stereo system, or a combination of the foregoing, for performing, playing, or otherwise presenting A/V program data to a user. As used herein, A/V program data comprises audio information, visual information, or a combination thereof, available in a variety of formats and available as a real time data stream and/or data file. For example, A/V program data may comprise still images such as, but not limited to, scanned photograph files or digital image files; video content such as, but not limited to, movie or video content, a television broadcast, or streaming video content; and/or audio content such as, but not limited to, an audio broadcast or a digital sound file.

In FIG. 1, each sink component 12 is illustrated as a separate and discrete component apart from a communicatively coupled presentation device 14; however, it should be understood that sink component 12 may also be configured as part of a corresponding presentation device 14 such that the functionality of sink component 12 resides within a corresponding presentation device 14. Source component 16 comprises any device or source of A/V program data such as, but not limited to, a server, the Internet, a digital camera, a printer, a telephone, a digital versatile disk (DVD) drive or player, a satellite tuner/receiver/demodulator, a stereo receiver, a cable tuner, a personal video recorder or digital video recorder (PVR/DVR), a computer, hard drive, or any other type of device for receiving, storing and/or transmitting analog and/or digital A/V program data. As illustrated in FIG. 1, source component 16 may also be communicatively coupled to at least one presentation device 14. Source component 16 may also be configured as part of a presentation device 14.

Briefly, in operation, each sink component 12 is adapted to communicate with at least one source component 16 via communication network 18 to identify and obtain A/V program data from a source component 16 and deliver or transmit the identified A/V program data to a presentation device 14. Each sink component 12 is also adapted to communicate with at least one source component 16 via communication network 18 to enable a user to access and control menu functions and/or parameters associated with source component 16. For example, in operation of some embodiments, source component 16 is adapted to transmit a stream of A/V menu data to sink component 12 to enable the user to identify, access and control menu functions and/or parameters of source component 16. As used herein, a stream of A/V menu data comprises a real time presentation of menu-related information associated with source component 16 such as, but not limited to, a menu function display for identifying various menu functions available from source component 16, a library and/or listing of A/V program data available from source component 16, a demodulation display for identifying and/or selecting particular A/V program data from source component 16, functions associated with initiating a transfer of selected A/V program data from source component 16, and menu information associated with particular A/V program data (e.g., a frame display associated with chapter selection of DVD-related A/V program data). A stream of A/V menu data may comprise a continuous or periodic data flow, predetermined or otherwise, such that the A/V menu data flow may comprise a series of content-filled frames, periodic content-filled frames interlaced with null bit frames and/or a non-constant frame rate flow where a new data frame is sent in response to a change or update to the data, thereby enabling automatic updating of A/V menu data provided to the user via sink component 12. Thus, in some embodiments, the format of the A/V menu data comprises graphical drawing commands (e.g., draw box and/or draw text) or low level compression algorithms.

Thus, in operation, each sink component 12 comprises an interface accessible by a user such that the user may remotely access an interface of the corresponding source component 16 to identify, access and/or control menu-related functions associated with source component 16 and/or A/V program data associated with source component 16. Thus, for example, in operation, sink component 12 issues or otherwise transmits commands based on user requests to corresponding source component(s) to identify, access and/or control presentation of A/V program data and menu-related functions associated with source component(s) 16 and/or A/V program data associated with source component(s) 16. Therefore, system 10 may be configured as a distributed architecture such that sink component 12 and source component 16 reside remote from each other such as, but not limited to, different rooms of a household or business, so that A/V program data residing on at least one remotely located source component 16 may be easily identified and transmitted to a desired presentation device 14 and enable the user to access and control menu functions associated with source component 16 and/or A/V program data associated with source component 16.

In the embodiment illustrated in FIG. 1, a centralized A/V data storage system 19 is also communicatively coupled to network 18 such that a variety of different types of A/V program data is available from a single source. For example, in the embodiment illustrated in FIG. 1, centralized A/V data storage system 19 comprises a server 20; however, it should be understood that other types of centralized storage systems may be used. In the embodiment illustrated in FIG. 1, various types of source components 16 may reside on server 20 such that different types of A/V program data may be available from a single source. Thus, in some embodiments, server 20 comprises source components 16 such as a satellite receiver, a DVD drive, a compact disk (CD) drive or any other type of source component 16. Additionally, a plurality of any one type of source component 16 may also reside on server 20. In operation, sink component 12 is also configured to enable a user to access and control menu functions associated with each source component 16 residing on system 19 and/or menu functions associated with particular A/V program data available from source components 16 residing on server 20. Thus, based on a user selection or request for particular A/V program data and/or menu-related functions associated with the A/V program data and/or a particular source component 16 residing on system 19, sink component 12 issues a command, request, or other type of communication signal to system 19 to enable the user to control, access or otherwise interact with a particular source component 16 residing on system 19.

In the embodiment illustrated in FIG. 1, at least one source component 16 is configured having a flexible A/V program data storage system such that A/V program data may be quickly and efficiently transferred to a corresponding sink component 12. For example, briefly, in the embodiment illustrated in FIG. 1, at least one source component 16 comprises a memory 30 and an archival storage system 34 for storing A/V program data 32. As will be described in greater detail below, memory 30 may comprise random access memory, local cache memory, or other types of memory to enable easy and efficient access to stored A/V program data 32 such that the stored A/V program data 30 may be quickly transferred to a corresponding sink component 12 in a real-time environment. Archival storage system 34 may comprise any type of storage back-up or extending device for storing A/V program data 32. As will be described in greater detail below, A/V program data 32 may be automatically transferred from memory 30 to archival storage system 34 after a predetermined time period of inactivity, in anticipation of memory 30 reaching a predetermined storage capacity, or other desired storage parameter. Additionally, in response to transfer of A/V program data to a particular sink component 12 or presentation of particular A/V program data 32 on a corresponding presentation device 14, related A/V program data residing on archival storage system 34 may be automatically transferred to memory 30, thereby providing a mechanism virtually anticipating a subsequent transfer of related A/V program data such as a sequential episode of a television program.

FIG. 2 is a diagram illustrating an embodiment of a sink component 12. In the embodiment illustrated in FIG. 1, sink component 12 comprises a processor 40, a user interface 42, a network interface 44, a source component interface 46 and a memory 48. User interface 42 enables a user to input information to sink component 12 and/or receive information from sink component 12. For example, an input device 50 such as, but not limited to, a keypad, touch screen, remote control unit, or other type of device, may be used by a user to input information to sink component 12 via interface 42 to enable corresponding commands or requests to be issued or otherwise transmitted to corresponding source component(s) 16. An output device 52 may be used to receive information from sink component 12 via interface 42 such as, but not limited to, a visual monitor, display or speaker. In FIG. 2, input device 50 and output device 52 are illustrated as separate components; however, it should be understood that input and output functions may be provided in a single device, such as a hand-held remote control unit, such that information may be communicated with sink component 12 via a single device. As illustrated in FIG. 2, a presentation device 14 may also be used as input device 50 and/or output device 52 for communicating information between a user and sink component 12. For example, a display screen or other mechanism may be available via a particular presentation device 14 such that sink component 12 may output information to the user via a particular presentation device 14 such as, but not limited to, a television screen or computer monitor, or sink component 12 may receive information from a user via a particular presentation device 14 such as, but not limited to, receiving a selection of a menu item displayed on a television screen or monitor.

Network interface 44 enables communication with a variety of different types of available communication networks 18 used to communicate information between source component(s) 16 and sink component(s) 12. For example, network 18 may comprise a wired or wireless network that may be selected depending on a particular application such as, but not limited to, the particular sink or source component(s) 12 and 16, respectively, or the type of A/V program data 32 communicated from a particular source component 16 to a particular sink component 12 such as, but not limited to, a local area network (LAN), a wireless LA/V (WLAN), a wide area network (WAN), a wireless WA/V (WWAN), the Internet, an intranet, etc. In the embodiment illustrated in FIG. 2, network interface 44 comprises a network manager 54 and at least one network adaptor 56. Network manager 54 and network adaptor 56 may comprise hardware, software, or a combination of hardware and software. Network manager 54 is configured to select a particular type of communications network 18 for communicating information between source component(s) 16 and sink component(s) 12. For example, network manager 54 may be configured to select a particular type of communication network 18 based on the type of source component 16, the type of A/V program data 32 desired from a particular source component 16, or other criteria associated with the communication of information between source component(s) 16 and sink component(s) 12. In some embodiments, network manager 54 is also adapted to monitor conditions on available or selected networks 18 and change networks 18 in response to predetermined criteria. Thus, in some embodiments, network manager 54 is configured to automatically change a type of network 18 used for communicating information between sink component 12 and source component(s) based on, for example, interference, power interruption, signal loss, and/or a change in the type of communicated content. Network adaptor 56 provides an interface to the various types of communication networks 18 available for information communication between source component(s) 16 and sink component(s) 12. For example, in the embodiment illustrated in FIG. 2, network adaptors 56 comprise a wireless transceiver adaptor 57 and an Ethernet adaptor 58. However, it should be understood that other types of network adaptors 56 or interface software and/or hardware may be used to accommodate various types of communication networks 18 now known or later developed.

Source component interface 46 enables communication and access to an interface associated with a particular source component 16 such that sink component 12 may access and present to a user A/V program data 32 and/or A/V menu data available from a particular source component 16. For example, source component interface 46 cooperates and interfaces with source component 16 to enable a user to access and control menu functions associated with source component 16 such as, but not limited to, displaying and using a menu of the corresponding source component 16 to list, identify, select, manipulate, download, and/or perform other operations associated with A/V program data 32 available from the corresponding source component 16. Thus, in operation, source component interface 46 enables a user to remotely perform a variety of operations associated with A/V program data 32 of a desired source component 16 via sink component 12.

In the embodiment illustrated in FIG. 2, sink component 12 also comprises a decoder 60, an aggregator 62, and a registration module 64. Decoder 60, aggregator 62, and registration module 64 comprise software, hardware, or a combination of hardware and software. In FIG. 2, decoder 60, aggregator 62, and registration module 64 are illustrated as being stored in memory 48 so as to be accessible by processor 40. However, decoder 60, aggregator 62, and registration module 64 may be otherwise stored, even remotely, as to be accessible and executable by processor 40.

Decoder 60 decodes, decrypts, decompresses and/or performs other data manipulation or formatting operations to A/V program data 32 received from a particular source component 16. For example, in some embodiments, decoder 60 is configured to decode various types of A/V program data 32 for presentation of A/V program data 32 on a particular presentation device 14. Thus, decoder 60 may be used to decrypt and/or decompress satellite program data received from a satellite source component 16, digital A/V program data 32 received from a DVD drive source component 16, or other types of A/V program data 32 received from other types of source components 16. Decoder 60 may also perform formatting operations or other data manipulation functions to enable presentation of A/V program data on a desired presentation device 14. In the embodiment illustrated in FIG. 2, decoder 60 is configured to identify and decrypt content-protected A/V program data 32 (e.g., encrypted A/V program data 32) received from one or more source components 16. For example, decoder 60 is adapted to decrypt, decode and/or otherwise transform A/V program data 32 that is received from one or more sources 16 via, for example, the Internet, in an encrypted format and decrypt the A/V program data 32 to enable viewing thereof on presentation device 16.

Aggregator 62 aggregates A/V program data 32 available from source component(s) 16 such that a user may identify and select particular A/V program data 32 via sink component 12 without identifying or selecting a particular source component 16. For example, aggregator 62 identifies the various types of A/V program data 32 available from a single source component 16 and presents the different types of available A/V program data 32 to the user via user interface 42. Additionally, if multiple source components 16 are communicatively coupled to sink component 12, aggregator 62 aggregates A/V program data 32 available from each source component 16 such that a user may identify and select particular A/V program data 32 without identifying or selecting the corresponding source component 16. Thus, in operation, it is unnecessary for a user to know the location of A/V program data 32 or the identity of a corresponding source component 16 because aggregator 62 automatically acquires information associated with A/V program data 32 available from each source component and presents a listing of the available A/V program data 32 to the user via user interface 42.

Registration module 64 enables registration of various types of information and/or components of the system 10 by sink component 12. For example, in the embodiment illustrated in FIG. 2, registration module 64 comprises a source component registrator 70, a program data registrator 72, a network registrator 74, and a presentation device registrator 76. Source component registrator 70 performs a registration operation to identify and register each source component 16 and/or storage system 19 communicatively coupled to sink component 12 and available for accessing A/V program data 32. Program data registrator 72 is configured to identify the various types of A/V program data 32 available from each available source component 16. For example, program data registrator 72 is configured to identify the type of A/V program data 32 available from each source component 16 to enable and/or verify corresponding application of data decoding, decompression and/or formatting operations by decoder 60. Information acquired by program data registrator 72 may also be used by aggregator 62 such that, based on a particular presentation device 14 selected or identified for presenting A/V program data 32 to a user, aggregator 62 filters the available A/V program data 32 and presents or displays to the user via user interface 42 only the types of A/V program data 32 capable of being displayed or presented via the particular presentation device 14.

Network registrator 74 registers the various types of communication networks 18 available and/or coupled to sink component(s) 12 for accessing source component(s) 16 and communicating A/V program data 32 and/or A/V menu data from source component(s) 16 to presentation device(s) 14. For example, network registrator 74 initiates and performs a registration operation to identify the various types of available communication networks 18 such that a desired or predetermined type of communication network 18 may be used for accessing source component(s) 16 or transferring A/V program data 32 and/or A/V menu data from source component(s) 16. Presentation device registrator 76 identifies and registers presentation device(s) 14 communicatively coupled to sink component 12 for presenting A/V program data 32 and/or A/V menu data to a user. For example, presentation device registrator 76 initiates and performs a registration operation to identify and register each available presentation device 14 coupled to sink component 12 for presenting A/V program data 32 and/or A/V menu data. Information acquired by presentation device registrator 76 may also be used by decoder 60 such that selected A/V program data 32 may be formatted or otherwise manipulated to correspond with a particular type of presentation device 14. Additionally, information acquired by presentation device registrator 76 may be used to present the user with a listing of available presentation devices 14 such that the user may select a desired presentation device 14 for displaying or presenting desired A/V program data 32 and/or A/V menu data.

In the embodiment illustrated in FIG. 2, sink component 12 also comprises a database 80 having A/V program data 82, A/V menu data 83 and registration data 84. A/V program data 82 comprises information associated with A/V program data 32 obtained from source components 16. A/V menu data 83 comprises information associated menu information associated with source components 16 and/or A/V program data 32 obtained from source components 16. In FIG. 2, A/V program data 32 and A/V menu data acquired from or otherwise associated with a particular source component 16 is illustrated as being stored respectively as A/V program data 82 and A/V menu data 83 in database 80; however, it should be understood that A/V program data 32 and/or A/V menu data obtained from source component(s) 16 may or may not be stored in memory 48. For example, A/V program data 32 and/or A/V menu data obtained from source components 16 may be stored momentarily or briefly in database 80 respectively as A/V program data 82 and A/V menu data 83 to accommodate data formatting, decompression, or other data manipulations. However, it should also be understood that A/V program data 32 and/or A/V menu data 83 may, in some embodiments, be provided to presentation devices 14 in real-time or on-the-fly such that storage of A/V program data 32 and/or A/V menu data 83 obtained from source components 16 is unnecessary.

Registration data 84 comprises information associated with registration operations performed by registration module 64. For example, in FIG. 2, registration data 84 comprises presentation device data 90, network data 92, source component data 94, and format data 96. Presentation device data 90 comprises information acquired by presentation device registrator 76 such as, but not limited to, the identities and types of presentation devices 14 coupled to each available sink component 12. Network data 92 comprises information acquired by network registrator 74 such as, but not limited to, information associated with the various types of communication networks 18 coupled to sink component 12 for communicating with source component(s) 16. Source component data 94 comprises information acquired by source component registrator 70 such as, but not limited to, the identities and types of source components 16 coupled to particular sink components 12. Format data 96 comprises information associated with the various types of A/V program data 32 available from source component(s) 16. For example, format data 96 may comprise information identifying various types of A/V program data 32 available from a particular source component 16, the decoding algorithms for each type of available A/V program data 32, decompression schemes, and other data manipulation operations for providing A/V program data 32 in a presentable format to presentation devices 14.

In operation, a user may access sink component 12 via user interface 42 to identify and request presentation of A/V program data 32 and/or A/V menu data on a desired presentation device 14. The A/V program data 32 and/or A/V menu data may reside or may be retrieved/transmitted from any of a number of source components 16 such that the location of the A/V program data 32 and/or A/V menu data remains transparent to the user. For example, as described above, sink component 12 utilizes source component interface 46 to communicate and access a corresponding interface of each registered source component 16 to identify and present to the user an aggregated listing of available A/V program data 32 using aggregator 62. The user may select desired A/V program data 32 via user interface 42. Sink component 12 receives the selection of the desired A/V program data 32 and communicates with the corresponding source component 16 having the desired A/V program data 32 to facilitate presentation of the selected A/V program data 32 on presentation device 14.

Additionally, the user may access and control menu features and operations associated with the desired A/V program data 32 and/or the source of the desired A/V program data 32 without knowledge of the particular type or location of the data program source. For example, in some embodiments, sink component 12 is configured to receive A/V menu data from a single source component 16. In other embodiments, sink component 12 is configured to receive A/V menu data from a plurality of different source components 16 and present the A/V menu data received from each source component 16 separately based on a source of the data or in an aggregated form. The sink component 12 is also configured to transmit control commands to a corresponding source component 16 to control transmission of A/V program data 32 and/or A/V menu data to the sink component 12. Thus, sink component 12 is adapted to receive A/V program data 32 and/or A/V menu data from a plurality of different source components 16 and interface with each of the source components 16 to control presentation of the A/V program data 32 and/or A/V menu data to the user. The sink component 12 also enables a user to access and control menu features of corresponding source components 16 (e.g., channel up, channel down, play, pause, select, up direction, down direction, chapter selection, fast forward, rewind/reverse, stop) which may affect or otherwise be associated with the content of the A/V menu data stream, the A/V program data 32 available from a particular source component 16 and/or presentation of particular A/V program data 32. Additionally, in some embodiments, sink component 12 is configured to simultaneously present on a single presentation device 14 A/V program data 32 received from different source components 16. For example, A/V program data 32 may be retrieved and/or otherwise obtained from different source components 16, either separately or simultaneously, and simultaneously presented on a single presentation device 14. Thus, for example, sink component 12 is configured to receive audio content from one source component 16 and digital image files from another source component 16 and simultaneously present on a single presentation device 14 both the audio content and the digital image files. It should be understood that in some embodiments, sink component 12 is configured to simultaneously present different types of A/V program data 32 obtained from a single source component 16 (e.g., audio files and digital image files received from a single computer-type of source component 16) and/or different files and/or programs of the same type of A/V program data 32 (e.g., simultaneously display content from at least two different video files received from a single source component 16).

As described above, network manager 54 may select from one of a variety of different types of available and registered communication networks 18 for communicating with source component(s) 16. For example, one source component 16 may be communicatively coupled to a particular sink component 12 via a wired communications network 18 while another source component 16 may be coupled to the sink component 12 via a wireless communications network 18. Thus, network manager 54 controls and manages communications via communications network 18 corresponding to the type of communications network 18 coupled to a particular source component 16. Additionally, network manager 54 may also be configured to select a particular type of communication network 18 based on the type of source component 16 and/or the type of selected A/V program data. For example, for presentation quality, transfer efficiency, or other factors, network manager 54 may select a corresponding type of available communication network 18 according to predetermined and/or user-selected settings or criteria.

The selected A/V program data 32 is accessed from the corresponding source component 16 by sink component 12, and sink component 12 initiates transfer of the selected A/V program data 32 from source component 16 to sink component 12 via a selected communication network 18. Data registrator 72 identifies the type or format of the selected A/V program data 32 and accesses format data 96 to acquire corresponding decryption, decompression, or other manipulating algorithms for processing of the selected A/V program data 32. Decoder 60 decodes the selected A/V program data 32 and transmits the decoded A/V program data 32 to a desired presentation device 14. Additionally, as described above, decoder 60 may also apply corresponding decompression, formatting, or other data manipulating algorithms corresponding to the type of desired presentation device 14.

FIG. 3 is the diagram illustrating an embodiment of source component 16. In the embodiment illustrated in FIG. 3, source component 16 comprises a processor 100, a user interface 102, a network interface 104, and a sink component interface 106. As described above, source component 16 may comprise any type of device for receiving and/or storing A/V program data 32 such as, but not limited to, a DVD drive or player, a satellite tuner/receiver/demodulator, a stereo receiver, and/or a computer. User interface 102, network interface 104, and sink component interface 106 may comprise hardware, software, or a combination of hardware and software. User interface 102 enables information to be input to source component 16 by a user or output from source component 16 to the user. For example, in operation, input device 108 such as a keypad, touch screen, remote unit, or other type of device may be used to input information to source component 16. An output device 109 such as, but not limited to, a monitor, screen, or other type of device for presenting information to the user may be utilized by source component 16. As illustrated in FIG. 3, input device 108 and/or output device 109 may also comprise presentation device 14. For example, a monitor, screen, or other type of device associated with a particular presentation device 14 may be used by source component 16 for presenting information to the user or receiving information from a user.

Network interface 104 enables communication with sink component(s) 12 via communication network(s) 18. For example, network interface 104 may be configured to enable communications via a variety of different types of wired or wireless communications networks 18 with sink component(s) 12. Sink component interface 106 enables a user, via sink component 12, to access and/or control at least one operational parameter of source component 16. For example, sink component interface 106 is adapted to enable a user to list, identify, select, download, manipulate and/or perform other operations associated with A/V program data 32 available from source component 16. Sink component interface 106 also enables a user, via sink component 12, to interact with or otherwise control menu functions and operations associated with source component 16 and/or A/V program data 32 available from source component 16. Thus, sink component interface 106 provides a virtual interface to user interface 102 of source component 16 such that a user, via sink component 12, may perform all or a portion of functions available via user interface 102 using sink component 12. Therefore, for example, in the case of a multi-disk DVD player source component 16, the user, via sink component 12, may change a DVD selection, view a menu associated with the selected DVD, and initiate a transfer of DVD content for presentation on a particular presentation device 14.

In the embodiment illustrated in FIG. 3, sink component 106 comprises a menu interface 110 for enabling a user, via sink component 12, to access, control and otherwise utilize menu functions and/or operations associated with source component 16. For example, a user, via sink component 12, may view and traverse a menu associated with source component 16 to identify, select or otherwise perform an operation function associated with source component 16 and/or A/V program data 32 available from the corresponding source component 16. Thus, a user, via sink component 12 and, correspondingly, sink component interface 106 of source component 16, may identify, rename, select, initiate a transfer, change demodulation channels, or perform other functions associated with source component 16 and/or A/V program data 32 available from source component 16. It should also be understood that source component 16 may be configured without the availability of input and output devices 108 and 109, respectively, such that functions generally associated with user interface 102 are available only via sink component interface 106, thereby simplifying the manufacturing costs and complexity associated with source component 16.

In FIG. 3, source component 16 also comprises a memory 116 having a database 118. For illustrative purposes, A/V program data 32 and A/V menu data 119 is stored within database 118 so as to be accessible by processor 100. However, it should also be understood that, in operation, storage of A/V program data 32 and/or A/V menu data 119 may be unnecessary or may be temporary. For example, source component 16 may be configured to provide A/V program data 32 and/or A/V menu data 119 in real-time or on-the-fly to a particular sink component 12 such that storage of A/V program data 32 and/or A/V menu data 119 is unnecessary.

In some embodiments, for decreased manufacturing cost and complexity, source component 16 is configured to receive, store, and/or provide A/V program data 32 in a "raw" form such that sink component 12 performs decoding, decryption, decompression, formatting or other data manipulation operations to enable presentation or display of the A/V program data 32 on a corresponding presentation device 14. For example, in some embodiments, a DVD drive type of source component 16 may be configured to extract A/V program data 32 from a DVD and transfer the A/V program data 32 to a corresponding sink component 12 in a form corresponding to its stored form on the DVD such that the corresponding sink 12 manipulates the digital A/V program data 32 into content presentable to a user via presentation device 14. However, it should also be understood that source component(s) 16 may be configured to perform data manipulation operations to enable display or presentation of A/V program data 32 on a presentation device 14.

FIG. 4 is a diagram illustrating an embodiment of centralized A/V program data storage system 19 with server 20. In the embodiment illustrated in FIG. 4, server 20 comprises a processor 120, an interface 122, a memory 124 and a source manager 126. Interface 122 and source manager 126 may comprise software, hardware, or a combination of software and hardware. In the embodiment illustrated in FIG. 4, source manager 126 is illustrated as being stored in memory 124 so as to be accessible and executable by processor 120. However, it should be understood that source manager 126 may be otherwise stored, even remotely, so as to be accessible and executable by processor 120.

Interface 122 enables communication between server 20 and sink component(s) 12 via communication network(s) 18. For example, interface 122 is configured to enable communications between server 20 and sink component(s) 12 via a variety of different types of wired or wireless communications networks 18. Source manager 126 enables access, via sink component(s) 12, to various types of A/V program data 32 and corresponding A/V menu data 119 from a single source or location. For example, in the embodiment illustrated in FIG. 4, server 20 comprises source component(s) 16 for providing the various types of A/V program data 32 and corresponding A/V menu data 119 to a user via sink component 12. In FIG. 4, source component(s) 16 residing on server 20 comprise a satellite receiver source component 130, a cable source component 132, a DVD source component 134, and a CD source component 136. Thus, as illustrated in FIG. 4, various types of A/V program data 32 and corresponding A/V menu data 119 may be made available to a user via sink component 12 depending on the types of source component(s) 16 residing on server 20. For example, satellite receiver source component 130 may be configured to access and provide A/V program data 32 via a satellite communications network. Cable source component 132 may be configured to provide A/V program data 32 acquired via a cable-provider communication network. DVD source component 134 is configured to provide A/V program data 32 from a DVD. CD source component 136 is configured to provide A/V program data 32 from a compact disk or other optical medium. It should be understood that other types of source component(s) 16 may also reside on server 20.

Thus, in operation, server 20 enables a user to access a variety of types of A/V program data 32 and associated A/V menu data 119 from a single location. Source manager 126 is configured to manage and control acquisition of the various types of A/V program data 32 and associated A/V menu data 119 available from source component(s) 16 residing on server 20. For example, source manager 126 interfaces with sink component(s) 12 to enable access to the various source component(s) 16 residing on server 20 via interface 122. Thus, as described above, source manager 126 enables access to an interface corresponding to each available source component 16 residing on server 20 such that a user, via sink component 12, may identify, select, initiate a transfer, rename, change demodulation channels, or perform other operations generally available via a user interface associated with each source component 16. Preferably, source component(s) 16 residing on server 20 are configured as cards or other types of electronic circuit assembly components such that the source component(s) 16 cards or assemblies may be readily inserted into slots or other types of interface areas of server 20 to enable easy swappability or interchangeability of source component(s) 16 on server 20.

Figure 5:
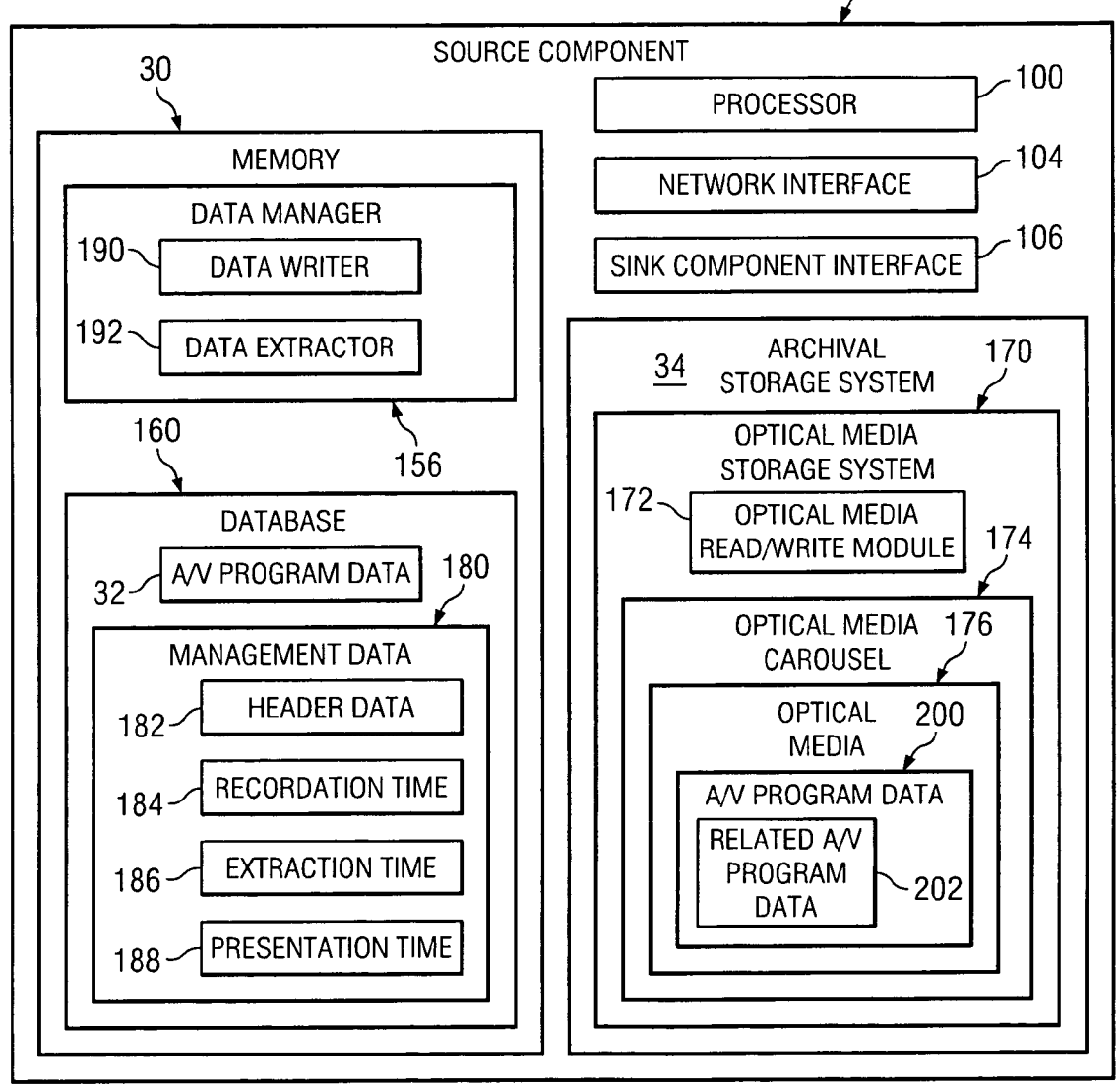
FIG. 5 is diagram illustrating an embodiment of another component of the audio/video component networking system illustrated in FIG. 1.

FIG. 5 is a diagram illustrating another embodiment of source component 16. In addition to all or a portion of the components illustrated in FIG. 3, in the embodiment illustrated in FIG. 5, source component 16 comprises processor 100, network interface 104, sink component interface 106, memory 30, and a data manager 156. Data manager 156 may comprise software, hardware, or a combination of software and hardware. In FIG. 5, data manager 156 is illustrated as being stored in memory 30 so as to be accessible and executable by processor 150. However, it should be understood that data manager 156 may be otherwise stored, even remotely, so as to be accessible and executable by processor 150.

Data manager 156 controls access and storage of A/V program data 32 available from source component 16. For example, as illustrated in FIG. 5, source component 16 comprises a database 160 stored in memory 30 and archival storage system 34. As described above, memory 30 may comprise random access memory, local cache memory, or other types of memory to enable efficient access to stored A/V program data 32 such that the A/V program data 32 stored in memory 30 may be quickly transferred to a corresponding sink component 12 in a real-time environment. Briefly, data manager 156 manages the storage and transfer of A/V program data 32 between database 160 and archival storage system 34 and between source component 16 and sink component(s) 12. For example, as will be described further below, data manager 156 may be configured to automatically transfer A/V program data 32 between memory 30 and archival storage system 34 based on a storage capacity of memory 30, a sequence of presentation of A/V program data 32 to a user, or other types of predetermined criteria or criteria as selected or determined by a user.

As illustrated in FIG. 5, archival storage system 34 comprises an optical media storage system 170. However, it should be understood that other types of optical or non-optical types of data storage mediums and systems may be used as archival storage system 34. In FIG. 5, optical media storage system 170 comprises an optical media read/write module 172 and an optical media carousal 174. Various types of optical media 176 may be located on or accessible by optical media carousal 174 such as, but not limited to, compact disks and digital versatile disks. Briefly, optical media read/write module 172 controls writing, reading, and other operations for information stored on optical media 176 on carousal 174.

As illustrated in FIG. 5, database 160 of memory 30 comprises A/V program data 32 and management data 180. Management data 180 comprises information associated with the management or transfer of A/V program data 32 between memory 30, archival storage system 34, and sink component (s) 12. For example, in the embodiment illustrated in FIG. 5, management data 180 comprises header data 182, a recordation time 184, an extraction time 186, and a presentation time 188. Header data 182 comprises information associated with or identifying A/V program data 32. For example, header data 182 may comprise information associated with the source of A/V program data 32, a title or other type of identifying information associated with A/V program data 32, and/or, in the case of a television series, information associated with an episode number for the A/V program data 32. Recordation time 184 comprises information associated with the receipt time and/or recording time of A/V program data 32. For example, recordation time 184 may comprise information associated with the time the particular A/V program data 32 was received or acquired from an external source, such as, but not limited to, a satellite communications network. Extraction time 186 comprises information associated with the time of extraction of particular A/V program data 32 from archival storage system 34. Presentation time 188 comprises information associated with a time of presentation of A/V program data 32 to a user via presentation device 14.

In operation, data manager 156 controls the movement or transfer of A/V program data 32 between memory 30 and archival storage system 34. For example, as illustrated in FIG. 5, data manager 156 comprises a data writer 190 and a data extractor 192. Data writer 190 controls and interfaces with optical media read/write module 172 to transfer A/V program data 32 from memory 30 to archival storage system 34. Data extractor 192 controls and interfaces with optical media read/write module 172 to extract A/V program data 32 from archival storage system 34.

In some embodiments, data manager 156 is configured to automatically transfer A/V program data 32 residing on memory 30 to archival storage system 34 when storage capacity of memory 30 reaches a predetermined limit. Thus, in operation, data manager 156 controls the transfer and storage of A/V program data 32 from memory 30 onto optical media 176 of archival storage system 34 via data writer 190, illustrated as A/V program data 200 in FIG. 5, when a storage capacity of memory 30 reaches a predetermined limit. Additionally, data manager 156 may be configured to automatically transfer A/V program data 200 from archival storage system 34 to memory 30 when a storage capacity of memory 30 falls below a predetermined threshold.

In response to a request for particular A/V program data 32 and/or 200, data manager 156 controls the transmission of the selected A/V program data 32 and/or 200 to sink component (s) 12 via network(s) 18. For example, data manager 156 provides an interface for sink component(s) 12 to identify, select and/or perform other operations associated with A/V program data 32 and/or 200 available from source component 16. If the selected data comprises A/V program data 200 stored on archival storage system 34, data manager 156 controls and manages the extraction of the selected A/V program data 200 from archival storage system 34 via data extractor 192 and transfers the selected A/V program data 200 to corresponding sink component(s) 12.

Data manager 156 may also be configured to automatically transfer A/V program data 32 from memory 30 to archival storage system 34 based on relationships between received A/V program data 32. For example, data manager 156 may be configured to automatically identify related A/V program data 32 based on header data 182 or recordation time 184. As described above, header data 182 may comprise information identifying the source, episode, identity, or other type of information that may be used by data manager 156 to identify and correlate particular A/V program data 32. Data manager 156 may also use recordation time 184 to identify relationships between received A/V program data 32. For example, in the case of a television series, recordation time 184 may illustrate that particular A/V program data 32 is received corresponding to a predefined or predetermined interval such that related A/V program data 32 may be identified. Based on the relationship between received A/V program data 32, particular A/V program data 32 may be transferred from memory 30 to archival storage system 34 and stored on optical media 176 as related A/V program data 202. For example, in the case of a television series, later received or recorded A/V program data 32 may be stored in archival storage system 34, while earlier received or recorded A/V program data 32 corresponding to the television series may be stored in memory 30 to enable quicker and easier access to the earlier received or recorded A/V program data 32 for presentation to the user. Thus, related A/V program data 202 stored on archival storage system 34 may be extracted from archival storage system 34 to accommodate presentation of the related A/V program data 202 corresponding to an aired sequence of episodes for the television series.

Additionally, data manager 156 may be configured to automatically extract related A/V program data 202 from archival storage system 34 and store the related A/V program data 202 in memory 30 based on the presentation of selected A/V program data 32 to a user. For example, data manager 156 may be configured to monitor transmission of A/V program data 32 to presentation device 14 via sink component(s) 12 or, alternatively, sink component(s) 12 may be configured to transmit a signal to source component 16 indicating presentation of selected A/V program data 32. The time of presentation of the selected A/V program data 32 to a user via presentation device 14 may be stored in database 160 as presentation time 188. Thus, in operation, data manager 156 monitors the presentation of the A/V program data 32 and, in response to presentation via presentation device 14 of desired A/V program data 32, data manager 156 automatically extracts related A/V program data 202 from archival storage system 34 such that the related A/V program data 202 may be easily and efficiently accessible for presentation to the user.

Thus, for example, in the case of a television series, earlier episodes may be stored in memory 30 as A/V program data 32 and later episodes may be stored in archival storage system 34 as related A/V program data 202. To accommodate the sequential and efficient presentation of episodes of the television series to the user, data manager 156 monitors the presentation of a particular episode and, upon the presentation of the particular episode to the user, data manager 156 automatically extracts the next sequential episode from archival storage system 34 and stores the next sequential episode in memory 30. As described above, header data 182, recordation time 184 or other types of information may be used by data manager 156 to identify and relate data 32 and 202. Therefore, based on a broadcast sequence of the A/V program data 32, data manager 156 enables efficient and sequential presentation of the A/V program data 32 corresponding to the broadcast sequence.

Data manager 156 may also be configured to automatically transfer A/V program data 32 from memory 30 to archival storage system 34 if a presentation time for the A/V data exceeds a predetermined period. For example, extraction time 186 and/or presentation time 188 may comprise information associated with an elapsed time period measured from receipt of A/V data in memory 30 from either an external source or archival storage system 34 to presentation of A/V data to a user via presentation device 14. Thus, if the elapsed time period exceeds a predetermined period, data manager 156 may be configured to automatically transfer the A/V data to archival storage system 34.

FIG. 6 is a diagram illustrating an embodiment of an audio/video component networking method. The method begins at block 300, where sink component 12 receives a request to access A/V program data 32 by a user. At block 302, sink component 12 performs a registration operation to determine and identify the available types of communication networks 18 for communicating with source component(s) 16. At block 304, sink component 12, using network registrator 74, identifies each available type of communication network 18 for communicating with source component(s) 16.

At decisional block 306, a determination is made whether multiple types of communication networks 18 are available for communicating with source component(s) 16. If multiple types of communication networks 18 are not available, the method proceeds to block 310. If multiple types of communication networks 18 are available for communicating with source component(s) 16, the method proceeds to block 308, where at least one of the available types of communication networks 18 for communicating with each corresponding source component 16 is selected. For example, as described above, different types of communication networks 18 may be available for communicating with different source components 16 such that network interface 44 of sink component 12 manages communication via the different communication networks 18 to each corresponding source component 16. The selection of a particular type of communication network may be based on the type or identity of a particular source component 16, the type of A/V program data 32 to be transferred from corresponding source component(s) 16, or other criteria predetermined or selected by the user.

At block 310, source component registrator 70 of sink component 12 performs a registration operation to identify accessible and/or available source components 16. At decisional block 312, a determination is made whether the user has selected a particular source component 16. For example, sink component 12 may be configured to present to the user a listing of available source components 16 for accessing available A/V program data 32 such that the user may select a particular source component 16. If the user did not identify a particular source component 16, the method proceeds to block 314, where sink component 12 identifies A/V program data 32 available from each accessible source component 16. At block 316, aggregator 62 aggregates the A/V program data 32 available from each accessible source component 16. For example, as described above, sink component 12 identifies A/V program data 32 available from each available and registered source component such that a listing of the available A/V program data 32 may be presented to the user while the identity of the corresponding source component 16 may remain transparent to the user.

At decisional block 312, if the user did select a particular source component 16, the method proceeds from block 312 to block 318, where sink component 12 accesses the selected source component 16. At block 320, sink component 12 identifies the available A/V program data 32 from the selected source component 16.

At decisional block 322, a determination is made whether a display is available to the user for viewing a listing of the available A/V program data 32. For example, as described above, the user may use input device 50 and/or output device 52 for communicating with sink component 12. If a display is available on the input device 50 and/or output device 52 used by the user to communicate with sink component 12, the method proceeds from block 322 to block 324, where the available aggregated A/V program data 32 is displayed to the user on the corresponding input and/or output device 50,52. If a display is not available for the input device 50 or output device 52 used by the user to communicate with sink component 12, the method proceeds from block 322 to block 326, where sink component 12 transmits a listing or otherwise viewable presentation of the available aggregated A/V program data 32 to the user via an associated presentation device 14. For example, if the corresponding presentation device 14 comprises a television, monitor, or other type of visual display device, the aggregated listing of available A/V program data 32 may be presented to the user using the associated presentation device 14.

At block 328, sink component 12 receives a selection of particular A/V program data 32 by the user. At block 330, sink component 12 accesses the corresponding source component 16 for the selected A/V program data 32. At block 332, sink component 12 accesses the selected A/V program data 32 from the corresponding source component 16. At block 334, sink component 12 identifies the format of the selected A/V program data 32. At block 336, presentation device registrator 76 performs a registration operation to identify available and/or accessible presentation devices 14 for presenting the selected A/V program data 32 to the user. As described above, a listing of the available presentation devices 14 may be provided to the user for selection or, if multiple presentation devices 14 are not available to sink component 12, a default presentation device 14 may be automatically selected. At block 338, sink component 12 receives a selection of a particular presentation device 14 for presenting the selected A/V program data 32 to the user.

At block 340, sink component 12 obtains the selected A/V program data 32 from the corresponding source component 16. At block 342, decoder 60 of sink component 12 decodes the selected A/V program data 32 for display on the selected presentation device 14. For example, as described above, decoder 60 may access format data 96 and/or presentation device data 90 to determine decompression, decryption, formatting and other data manipulation operations required for the selected A/V program data 32 for presentation of the selected A/V program data 32 on a particular presentation device 14. At block 344, sink component 12 transmits the decoded A/V program data 32 to the selected presentation device 14 for presentation to the user.

FIG. 7 is a flow chart illustrating another embodiment of an audio/video component networking method. The method begins at block 400, where source component 16 receives a request for particular A/V program data 32 from a sink component 12. At block 402, data manager 156 of source component 16 identifies the requested or selected A/V program data 32. At block 404, data manager 156 initiates transfer of the requested A/V program data 32 to a particular sink component 12 via communication network 18.

At block 406, data manager 156 accesses archival storage system 34. At the decisional block 408, a determination is made whether related A/V program data 202 resides on archival storage system 34. If related A/V program data 202 resides on archival storage system 34, the method proceeds from block 408 to decisional block 410, where a determination is made whether the requested A/V program data 32 has been presented to the user. If the requested A/V program data 32 has not yet been presented to the user via a presentation device 14, the method proceeds from block 410 to block 412, where data manager 156 monitors the presentation of the requested A/V program data 32 to the user. As described above, system 10 may be configured such that source component 16 monitors and communicates with sink component 12 to determine whether the requested A/V program data 32 has been presented to the user. Alternatively, upon presentation of the requested A/V program data 32 to the user via presentation device 14, sink component 12 may be configured to transmit a signal to source component 16 indicating presentation of the requested A/V program data 32. If the requested A/V program data 32 has been presented to the user, the method proceeds from block 410 to block 414, where data manager 156 extracts related A/V program data 202 from archival storage system 34 and stores the related A/V program data 202 in memory 30.

FIG. 8 is a flow diagram illustrating another embodiment of an audio/video component networking method. The method begins at block 500, where source component 16 receives A/V program data 32. As described above, the received A/V program data 32 may be acquired from a variety of different information sources such as, but not limited to, a satellite communications network, DVD, the Internet, or a radio broadcast. At block 502, data manager 156 identifies the received A/V program data 32. For example, as described above, data manager 156 may use header data 182 or other types of information to identify the received A/V program data 32.

At decisional block 504, a determination is made whether the recently received A/V program data 32 is related to A/V program data 32 residing in memory 30. If the recently received A/V program data 32 is not related to A/V data stored in memory 30, the method proceeds to block 514, where data manager 156 stores the recently received A/V data in memory 30. If A/V program data 32 resides in memory 30 that is related to the recently received A/V program data 32, the method proceeds to block 506, where data manager 156 determines a sequential relationship for the recently received A/V program data 32 and the A/V program data 32 stored in memory 30. For example, as described above, for television series information and other sequence- or episode-based content, data manager 156 may access header data 182, recordation time 184, or other information to determine a sequential order for the content.

At decisional block 508, a determination is made whether the recently received A/V program data 32 is later in sequence than the A/V program data 32 stored in memory 30. If the recently received A/V program data 32 is later in sequence than the A/V program data 32 stored in memory 30, the method proceeds to block 510, where data manager 156 stores the recently received A/V program data 32 in archival storage system 34 as related A/V program data 202. If the recently received A/V program data 32 is earlier in sequence than the A/V data stored in memory 30, the method proceeds from decisional block 508 to block 512, where data manager 156 transfers the A/V data stored in memory 30 to archival storage system 34. The method proceeds to block 514, where data manager 156 stores the recently received A/V data in memory 30.

Figure 9:
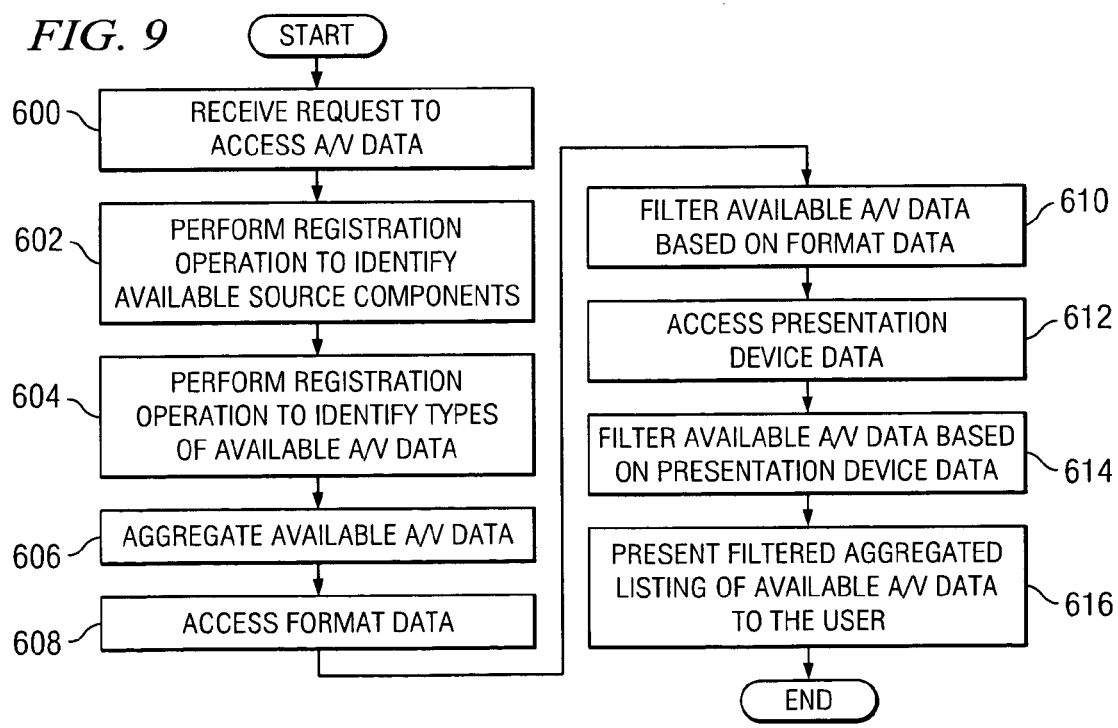
FIG. 9 is a flow diagram illustrating yet another embodiment of an audio/video component networking method.

FIG. 9 is a flow diagram illustrating another embodiment of an audio/video component networking method. The method begins at block 600, where sink component 12 receives a request from a user to access A/V program data 32. At block 602, source component registrator 70 of sink component 12 performs a registration operation to identify available source components 16 coupled to sink component 12. At block 604, data registrator 72 of sink component 12 performs a registration operation to identify the types of A/V program data 32 available from each registered source component 16.

At block 606, aggregator 60 of sink component 12 aggregates A/V program data 32 available from each registered source component 16. At block 608, aggregator 60 accesses format data 96 to determine whether decoder 60 is adapted to decode, decrypt, decompress, format or otherwise manipulate the available A/V program data 32 for presentation on presentation device 14. For example, as described above, format data 96 may comprise various algorithms for decoding or otherwise manipulating particular types of A/V program data 32 such as, but not limited to, A/V program data 32 acquired from a DVD, A/V program data 32 acquired via a satellite signal, motion pictures expert group (MPEG) content, or audio broadcast content. At block 610, aggregator 60 filters the available A/V program data 32 based on the format data 96 such that only A/V program data 32 presentable or displayable by decoder 60 is presented to the user.

At block 612, aggregator 60 accesses presentation device data 90 acquired by presentation device registrator 76 to identify the available types of presentation devices 14 or, alternatively, the presentation device 14 selected by the user, for presentation of the available A/V program data 32. At block 614, aggregator 60 filters the available A/V program data 32 based on the presentation device data 90 such that only A/V program data 32 presentable or displayable on the corresponding presentation device(s) 14 is presented to the user. At block 616, aggregator 60 of sink component 12 displays or presents to the user a filtered listing of available A/V program data 32.

FIG. 10 is a diagram illustrating another embodiment of audio/video component networking system 10. In the embodiment illustrated in FIG. 10, presentation device 14 comprises a user interface 700 to receive input commands from an input device 702, such as a keypad, an infrared input from a remote control, or any other type of input device 702. Presentation device 14 further comprises sink component 12 and a sink interface 704 to enable and prioritize communications between sink component 12 and presentation device 14. In the embodiment illustrated in FIG. 10, sink interface 704 comprises a command processing module 706 for receiving input commands from input device 702 via user interface 700 and determining whether the input command should be processed via presentation device 14 or whether the input command should be processed by sink component 12. Sink interface 704 may comprise software, hardware, firmware, or a combination thereof.

In the embodiment illustrated in FIG. 10, presentation device 14 comprises a high definition television device 708 and at least one source component 16 coupled to presentation device 14 via network 18 comprises a digital camera 710. Digital camera 710 comprises digital image files for display on high definition television 708. In operation, if command processing module 706 determines that an input command received from input device 702 is directed to a function of camera 710 (e.g., a request by a user to view digital images therefrom), command processing module 706 directs and/or otherwise forwards the input command to sink component 12 to facilitate processing thereof by sink component 12. If command processing module 706 determines that the input command is directed to a function of television 708 (e.g., the volume control, picture size, brightness, etc.), command processing module 706 directs the input command to television 708 for processing. Accordingly, command processing module 706 enables integration and control of at least two applications (e.g, camera 710 and television 708) from one common user input device 702, such as for example, a television remote control.

In the embodiment illustrated in FIG. 10, sink interface 704 further comprises a reset module 712. Reset module 712 is configured to monitor the status of communications between sink component 12 and presentation device 14 and/or otherwise detect whether a communication and/or other type of disconnection and/or malfunction may have occurred. For example, reset module 712 monitors the communications (or lack of communications) between sink component 12 and presentation device 14 such that if in the event sink device 12 becomes non-operational (e.g., due to a software malfunction), reset module 712 automatically issues a command to sink component to force and/or otherwise cause a reset of sink component 12 to enable sink component 12 to recover. In operation, handshake or other types of signals may be used to monitor the status of sink component 12.

Embodiments of system 10 may be implemented in software and can be adapted to run on different platforms and operating systems. In particular, functions implemented by sink interface 704, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain or store, the program for use by or in connection with the instruction execution system, apparatus, or device. The computer-readable medium can be, for example, but is not limited to, an electronic, magnetic or semi-conductor system, apparatus, or device.

Thus, embodiments enable the user to identify, select, hear and/or view A/V program data 32 available from any one of a plurality of locally or remotely distributed source components 16 via a sink component 12 and desired presentation device 14. For example, in some embodiments, a sink component 12 may be coupled to a television presentation device 14 in one room. Using the sink component 12, the user may identify and/or select A/V data available from, for example, a satellite receiver source component 16 residing in another room, a computer source component 16 residing in yet another room, and/or a DVD player source component 16 residing in yet another room. The user may access and interface with a menu or other type of A/V program data 32 control parameter associated with each of the source components 16.

Additionally, in some embodiments, the sink component 12 may be configured to present an aggregated listing of the A/V program data 32 available from each of the locally or remotely distributed source components 16, thereby enabling the user to identify A/V data available from each of the source components 16 while the identity of the source components 16 remains transparent to the user. Further, the sink component 12 may be configured to filter the aggregated A/V program data 32 listing based on a format of the A/V program data 32, the type of presentation device 14 used for presenting the A/V program data 32 to the user, or other filtering factors. The aggregated A/V program data 32 listing may be displayed to the user using a particular presentation device 14 or an input or output device 50,52 associated with the sink component 12.

Embodiments may also be configured to provide a flexible A/V program data 32 storage system such that A/V program data 32 is transferred to an archival storage system 34 based on a memory 30 storage capacity, relationships between received A/V program data 32, or other factors. Thus, for example, A/V program data 32 that is related in some respect, such as sequential episodes of a television broadcast, may be automatically stored in and retrieved from the archival storage system 34 to accommodate a sequential presentation of the related A/V program data 32.

Embodiments may also be configured to provide a central A/V program data 32 source such that various types of A/V program data 32 are available from a single source, thereby centralizing processing and other data manipulation operations. For example, in some embodiments, a server 20 or other type of centralized data storage mechanism may be used to centrally store a variety of types of source components 16 for providing a user, via a sink component 12, with a variety of different types of A/V program data 32.

Embodiments may also be configured to provide a command processing module 706 to manage and/or otherwise direct input commands to particular devices (e.g., either sink component 12 or presentation device 14). Further, processing module 706 enables integration and control of at least two applications (e.g, camera 710 and television 708) from one common user input device 702, such as for example, a television remote control. Embodiments also provide reset module 712 to monitor communications (or lack of communications) between sink component 12 and presentation device 14 such that if in the event sink device 12 becomes non-operational, such as for example, due to a software malfunction, reset module 712 will force a reset of sink component 12 to enable sink component 12 to recover. Embodiments may also provide sink component 12 configured to simultaneously present A/V program data 32 on presentation device 14 from two or more source components 16. Further, decoder 60 may be configured to identify and decrypt content protected A/V program data 32 (e.g., encrypted A/V program data) received from one or more source components 16 in an encrypted format.

It should be understood that in the methods described in FIGS. 6-9, certain functions may be omitted, combined, or accomplished in a sequence different than depicted in FIGS. 6-9. Also, it should be understood that the methods depicted in FIGS. 6-9 may be altered to encompass any of the other features or aspects described elsewhere in the specification.

What is claimed is:

1. An audio/video (A/V) component networking system, comprising:
    a presentation device; and
    a sink component having a decoder and configured to:
        identify different types of A/V program data available from different source components;
        apply filtering of the different types of A/V program data to determine which of the different types of A/V program data are decodable by the decoder in the sink component to present on the presentation device, wherein application of the filtering is to produce a subset less than all of the different types of A/V program data;

present a listing of the types of A/V program data in the subset determined to be decodable by the decoder in the sink component; and simultaneously present on the presentation device A/V program data received from at least two of the different source components.

2. The system of claim 1, wherein the sink component is disposed within the presentation device.

3. The system of claim 1, wherein the decoder is configured to decrypt content-protected A/V program data received from at least one of the source components.

4. The system of claim 1, wherein the sink component is configured to retrieve the different types of A/V program data simultaneously from at least two of the different source components.

5. The system of claim 1, wherein at least one of the source components is a camera.

6. The system of claim 1, wherein the listing is presentable to a user.

7. The system of claim 1, wherein the decoder is configured to decompress A/V program data received from at least one of the source components.

8. A non-transitory computer-readable medium having stored thereon an instruction set to be executed, the instruction set, when executed by a processor, causes the processor to:

identify different types of A/V program data received from different source components;

apply filtering of the different types of A/V program data to determine which of the different types of A/V program data are decodable by the processor to present on a presentation device, wherein applying the filtering produces a subset less than all of the different types of A/V program data; and present a listing of the types of A/V program data in the subset determined to be decodable by the processor.

9. The computer-readable medium of claim 8, wherein the processor includes a decoder.

10. The computer-readable medium of claim 8, wherein presenting the listing comprises presenting the listing to a user.

11. The computer-readable medium of claim 8, wherein the instruction set when executed by the processor causes the processor to decrypt at least one of the different types of A/V program data.

12. The computer-readable medium of claim 8, wherein the instruction set when executed by the processor causes the processor to decompress at least one of the different types of A/V program data.

13. An audio/video (A/V) component networking method, comprising:

identifying, by a sink component, different types of A/V program data available from different source components;

applying filtering of the different types of A/V program data for determining which of the different types of A/V program data are decodable by a decoder in the sink component, wherein applying the filtering produces a subset less than all of the different types of A/V program data;

presenting a listing of the types of A/V program data in the subset determined to be decodable by the decoder in the sink component; and simultaneously presenting on a presentation device A/V program data from at least two of the different source components.

14. The method of claim 13, further comprising decrypting at least one of the different types of A/V program data by the decoder in the sink component, wherein the at least one of the different types of A/V program data is content-protected.

15. The method of claim 13, wherein presenting the listing comprises presenting the listing to a user.

16. The method of claim 13, further comprising decompressing at least one of the different types of A/V program data by the decoder in the sink component.

* * * * *